United States Patent
Hancock et al.

(10) Patent No.: US 7,738,140 B2
(45) Date of Patent: Jun. 15, 2010

(54) SYSTEM AND METHOD FOR AUTOMATED SPOT COLOR EDITOR

(75) Inventors: Joseph D. Hancock, Rochester, NY (US); Peter S. Fisher, Pasadena, CA (US); Lalit K. Mestha, Fairport, NY (US); Kenneth J. Mihalyov, Webster, NY (US); Tonya L. Love, Rochester, NY (US); Peter A. Crean, Penfield, NY (US); Matthew F. Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 968 days.

(21) Appl. No.: 11/507,405

(22) Filed: Aug. 21, 2006

(65) Prior Publication Data

US 2008/0043263 A1   Feb. 21, 2008

(51) Int. Cl.
- G03F 3/08 (2006.01)
- G06K 15/00 (2006.01)
- G06K 9/00 (2006.01)
- H04N 1/40 (2006.01)

(52) U.S. Cl. .................. 358/1.9; 358/2.1; 358/518; 358/523; 358/3.23; 382/162; 382/167

(58) Field of Classification Search .................. 358/1.9, 358/2.1, 1.15, 1.1, 1.6, 525, 518, 520, 523, 358/527, 1.18, 1.16, 1.17, 3.13, 3.23, 1.11; 382/162, 167

See application file for complete search history.

(56) References Cited

U.S. PATENT DOCUMENTS

| | | |
|---|---|---|
| 5,452,094 A | 9/1995 | Ebner et al. |
| 5,809,213 A | 9/1998 | Bhattacharjya |
| 6,043,909 A | 3/2000 | Holub |
| 6,072,589 A | 6/2000 | Rozzi |
| 6,157,469 A | 12/2000 | Mestha |
| 6,157,735 A | 12/2000 | Holub |
| 6,178,007 B1 | 1/2001 | Harrington |
| 6,222,648 B1 | 4/2001 | Wolf et al. |
| 6,344,902 B1 | 2/2002 | Duke et al. |
| 6,456,395 B1 | 9/2002 | Ringness |
| 6,636,628 B1 | 10/2003 | Wang et al. |
| 6,744,531 B1 | 6/2004 | Mestha et al. |

(Continued)

OTHER PUBLICATIONS

U.S. Appl. No. 11/507,406, filed Aug. 21, 2006, Alvaro E. Gil, et al.

*Primary Examiner*—Charlotte M Baker
(74) *Attorney, Agent, or Firm*—Pillsbury Winthrop Shaw Pittman LLP

(57) ABSTRACT

Provided is a method for enabling accurate and consistent imaging of selected colors within a document for various printing device configurations utilizing an automated spot color editor. The method includes determining appropriate target values for a selected color within a print job. The automated spot color editor modifies or adjusts the selected color by selecting a quality level, in the form of a color difference metric, and a maximum number of iterations, which is the maximum number of times the automated spot color editor is operated to calculate a CMYK color formula. Sample patch(es) are printed and analyzed for the selected target value and a CMYK color formula based on the color composition of the sample patch is calculated. The CMYK color formula is inserted into a spot color editing table. Through a graphical user interface, an operator may review the color formula for acceptance.

20 Claims, 3 Drawing Sheets

U.S. PATENT DOCUMENTS

| | | |
|---|---|---|
| 6,809,837 B1 | 10/2004 | Mestha et al. |
| 6,934,053 B1 | 8/2005 | Mestha et al. |
| 7,034,960 B2 * | 4/2006 | Stone et al. .................. 358/1.9 |
| 7,069,164 B2 | 6/2006 | Viturro et al. |
| 7,072,084 B2 * | 7/2006 | Shirasawa ................... 358/525 |
| 7,480,070 B2 * | 1/2009 | Falk .......................... 358/1.18 |
| 2002/0093684 A1 | 7/2002 | Bares et al. |
| 2004/0141193 A1 | 7/2004 | Mestha |
| 2005/0030560 A1 | 2/2005 | Maltz et al. |
| 2005/0071104 A1 | 3/2005 | Viturro et al. |

* cited by examiner

SYSTEM AND METHOD FOR AUTOMATED SPOT COLOR EDITOR

CROSS-REFERENCE TO RELATED APPLICATIONS

The following co-pending application, U.S. application Ser. No. 11/507,406, filed Aug. 21, 2006, titled "Spot Color Controls and Method", is assigned to the same assignee of the present application. The entire disclosure of this co-pending application is totally incorporated herein by reference in its entirety.

BACKGROUND AND SUMMARY

This disclosure relates generally to methods and systems for color management in image/text printing or display systems, and more particularly to a system and method for automatically achieving spot color production with consistency and accuracy for a variety of printer configurations.

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success or failure in meeting customer requirements.

A goal of the disclosed system and method is to transform the current production print practice by providing an automated approach to the printing of spot colors. Because imaging can occur over a variety of different printing systems and practiced by a variety of different clients and customers, the colors may not always be consistent or accurate. Existing spot color editors utilize a manual approach to the adjustment of CMYK combinations of spot colors prior to raster image processing (RIPing). For example, the document creator may select a Pantone® color for application in specific areas through a user interface on a printing device or computer monitor, such as that available on the Xerox® DocuSP® Controller. The Pantone-provided CMYK combination for the selected printer is obtained from a look-up table. Prior to RIPing the document in the printer, the operator has the option of entering a spot color editor function and specifying an alternative CMYK combination to achieve the desired color. The document is then RIPed and then printed using the spot color editor combinations where specified, and Pantone combinations otherwise.

This workflow presents various problems, among which is operator error associated with manual adjustments of the CMYK combinations; modifications to the CMYK values may result in more variability from machine to machine. Also, the manually-adjusted CMYK values may require more iterations to achieve the desired color. Due to the manual adjustments it may be difficult for customers to achieve the correct CMYK combinations even after repeated trials. Consequently, a customer has no assurance that the print shop that has been chosen to produce a job can reliably produce the colors as intended, unless every print job is reviewed by a well trained expert who is very familiar with all the capabilities of a given print shop.

All U.S. patents and published U.S. patent applications cited herein are fully incorporated by reference. The following patents or publications are noted:

U.S. Patent Application Publication No. 2002/0093684 to Bares et al. ("Accurate Printing of Proprietary Mark Patterns and Colors") describes a printing system that provides a dictionary of recognizable patterns and defined colors corresponding to proprietary marks and selected colors. The dictionary is linked to a user interface on which a user may designate a location within a document and one or more of the proprietary marks with defined colors from an accessible menu. A processor associates the defined colors with the image at the specified location and generates a printer signal representative of the colors and image. Alternatively, the processor may include a pattern recognizer for identifying recognizable patterns within a document. Those patterns having a likeness to defined patterns within the pattern dictionary can be converted to the defined patterns for display or imaging.

U.S. Pat. No. 6,157,469 to Mestha ("Dynamic Device Independent Image Correction Method and Apparatus") describes a method of controlling color drift between a desired image and an output image as obtained by a marking device and intended to match the desired image. The method includes detecting a current output color in the output image with a color sensing device, determining a difference between the current output color in the output image and a corresponding color in the desired image, and automatically setting a next output color in the output image equal to a corrected color that minimizes the difference between the next output color and the corresponding color in the output image.

U.S. Pat. No. 6,178,007 to Harrington ("Method for Continuous Incremental Color Calibration for Color Document Output Terminals") teaches a method for continuously upgrading the color calibration for an electrophotographic printer using a color transform look up table stored in memory. A single or small number of color patch samples is printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

U.S. Pat. No. 6,744,531 to Mestha et al. ("Color Adjustment Apparatus and Method") teaches an apparatus for providing consistent output across a plurality of different hard copy output devices which may be included in a system having an image data source and a hard copy output device. The image data source supplies image data to a printable image data adjusting apparatus. The image data supplied may be in a device-dependent color space or a device-independent color space. For image data in a device-dependent color space, the adjusting apparatus first converts the image data into device-independent image data and stores it in memory as target image data. If the image data is already device-independent, the image data are stored in the memory of the adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are used to produce a hard copy image having detected device-independent image data values that more closely represent the target image data.

U.S. Pat. No. 7,069,164 to Viturro et al. ("Method for Calibrating a Marking System to Maintain Color Output Consistency Across Multiple Printers") teaches a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. The printed reference allows one to achieve relatively high system performance by removing sensor inaccuracies. Using the printed reference measured by the inline sensor, control systems of each machine are calibrated. At customer sites and at suitable intervals, a reference document can be read using the inline sensor on a reference machine and any differences from expected values can be calibrated out.

U.S. Patent Application Publication No. 2005/0030560 to Maltz et al. ("Methods and Systems for Controlling Out-of-gamut Memory and Index Colors") describes methods and systems in an image processing device for controlling colors that are located external to a gamut. A plurality of color values can be automatically provided as input to said image processing device, wherein the image processing device is under the control of a particular dimensional order, typically a three-dimensional order, but alternatively can be a two-dimensional order. An operation can then be performed dynamically determining which color value among the plurality of color values has attained a gamut limit. Thereafter, the particular dimensional order can be automatically reduced, providing improved control for colors that are located external to the gamut. The plurality of color values analyzed is generally associated with three colors: cyan, magenta, and yellow.

The disclosed embodiments provide examples of improved solutions to the problems noted in the above Background discussion and the art cited therein. There is shown in these examples an improved method for enabling accurate and consistent imaging of selected colors within a document for various printing device configurations utilizing an automated spot color editor. The method includes determining appropriate target values for a selected color within a print job. The selected color may be described as being within a color space such as reflectance spectra, L*a*b*, XYZ, LHC, CMYK, RGB, sRGB, parameters describing color or a color number. The automated spot color editor modifies or adjusts the selected color by selecting a quality level, in the form of a color difference metric, and a maximum number of iterations, which is the maximum number of times the automated spot color editor is operated to calculate a CMYK color formula. Sample patch(es) are printed and analyzed for the selected target value and a CMYK color formula based on the color composition of the sample patch is calculated. The CMYK color formula is inserted into a spot color editing table. Through a graphical user interface, an operator may review the color formula for acceptance.

In an alternate embodiment there is disclosed a system for utilizing an automated spot color editor for enabling accurate and consistent imaging of selected colors within a document for various printing device configurations. The spot color editor determines appropriate target values for a selected color within a print job. The selected color exists within a color space, which may include reflectance spectra, L*a*b*, XYZ, LHC, CMYK, RGB, sRGB, parameters describing color or a color number. To modify or adjust the selected color, the spot color editor selects a quality level in the form of a color difference metric and a maximum number of iterations to be performed to calculate a CMYK color formula. A sample patch for the selected target value is printed and the color composition of the sample patch is analyzed. After a CMYK color formula based on the color composition of the sample patch is calculated, the CMYK color formula is inserted into a spot color editing table. An operator may indicate acceptance of the color formula through a graphical user interface.

In yet another embodiment there is disclosed a computer-readable storage medium having computer readable program code embodied in the medium which, when the program code is executed by a computer, causes the computer to perform method steps for enabling accurate and consistent imaging of selected colors within a document for various printing device configurations utilizing an automated spot color editor. The method includes determining appropriate target values for a selected color within a print job. The selected color may be described as being within a color space such as reflectance spectra, L*a*b*, XYZ, LHC, CMYK, RGB, sRGB, parameters describing color or a color number. The automated spot color editor modifies or adjusts the selected color by selecting a quality level, in the form of a color difference metric, and a maximum number of iterations, which is the maximum number of times the automated spot color editor is operated to calculate a CMYK color formula. Sample patch(es) are printed and analyzed for the selected target value and a CMYK color formula based on the color composition of the sample patch is calculated. The CMYK color formula is inserted into a spot color editing table. Through a graphical user interface, an operator may review the color formula for acceptance.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
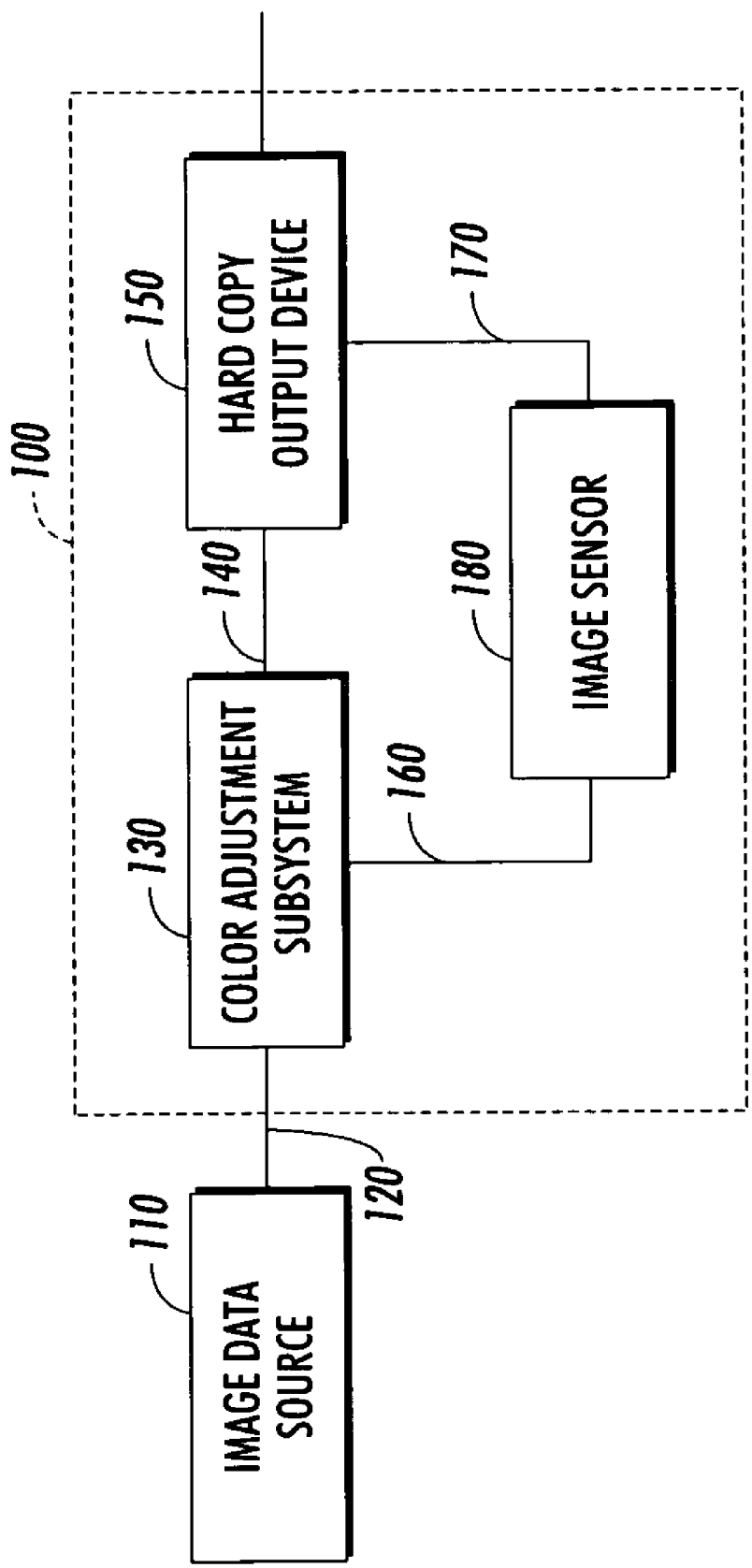
FIG. 1 is a functional block diagram of one exemplary embodiment of a print system in accordance with the automated spot color editor.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The automated spot color editor improves upon the existing methods for adjusting or developing CMYK combinations to achieve consistency and accuracy in the print production of spot colors. The spot color editor provides an automated process under closed-loop control, based on Pantone-defined or customer-defined target values. The editor determines the appropriate target values for the desired customer colors and then activates the Automated Spot Color Editor (ASCE), which utilizes various functionality to achieve consistent customer selectable colors. The ASCE prints a target patch(es) using the desired target values, measures the color of the printed patch using a color sensor such as an in-line spectrophotometer, calculates the CMYK combination based on the measurement, and inserts the resultant CMYK combination into a Spot Color Editing table. Additionally, the operator may be provided with the ability to accept the resultant CMYK combination or make adjustments manually. Optionally, a preflight review of the submitted job may be performed to automatically determine whether spot colors are present in the submitted print job.

Various computing environments may incorporate capabilities for supporting a network on which the automated spot color editor may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, there is depicted a functional block diagram of one example embodiment of a print color adjustment system in accordance with the automated spot color editor disclosed herein. It is to be understood that certain aspects of the system would operate in accordance with preprogrammed instructions used to operate a local or networked computer system to carry out such features—perhaps on a plurality of interconnected computers at a time. Such a system might include a commercially available personal computer with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation. As shown in FIG. 1, print color adjustment system 100 is connected to an image data source 110, and includes color adjustment subsystem 130, a hard copy output device 150, and an image sensor 180. These devices are coupled together via data communication links 120, 140, 160, and 170. These links may be any type of link that permits the transmission of data, such as direct serial connections, a local area network (LAN), wide area network (WAN), an intranet, the Internet, circuit wirings, and the like.

The content for a printing job is initially provided by the customer through an image data source 110 in a form acceptable to the system. The image data source may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 110 may include a plurality of components including displays, user interfaces, memory, disk drives, and the like. For simplicity of the following disclosure, it will be assumed that the image data source is a personal computer although, as indicated above, the image data source is not limited to a personal computer.

Hard copy output device 150 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device 150 generates the hard copy of the image based on printable image data generated by the color adjustment subsystem.

Image sensor 180 may be any type of device that is capable of detecting image data from a hard copy image and supplying the image data as detected device-independent image data or post-processed image data, which may be in device-independent or in device-dependent form to the color adjustment subsystem 130. For example, the image sensor may be an optical sensor, a spectrophotometer, a color sensor, or any other known or later developed device or system that is able to measure the color values of the image data from the hard copy image output by the hard copy output device 150.

Although for the purposes of description color adjustment system 100 is shown as a separate device from the image data source 110, the color adjustment system 100 may be an integrated device, such as a digital copier, a computer with a built-in printer, or any other integrated device that is capable of producing a hard copy image output. With such a configuration, for example, the image data source 110, the color adjustment subsystem 130, the hard copy output device 150, and the sensor 180 may be contained within a single device.

Alternatively, the color adjustment system 100 may be a separate device containing the color adjustment subsystem 130 and the sensor 180 attachable upstream of a stand-alone hard copy output device 150. For example, the color adjustment subsystem 130 and the sensor 180 may be a device which interfaces with both the image data source 110 and one or more hard copy output devices 150, as would be the case if the color adjustment system 100 is incorporated into a network print server that manages printer data for a plurality of the same or different printing devices.

Furthermore, the color adjustment system 100 may be implemented as software on the color adjustment subsystem 130 or the image data source 110. The image sensor 180 may be incorporated into the printer 150 or may exist as a stand alone device that communicates the detected data back to the image data source 110. Other configurations of the elements shown in FIG. 1 may be utilized without departing from the spirit and scope of the specification and claims herein.

The term "image", as used in this disclosure refers to a graphic or plurality of graphics, compilation of text, a contone or haftone pictorial image, or any combination or subcombination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images". Thus an image may be a document image assembled by a customer at the image data source 110, one or more elements of a document image, a "test patch" generated by printing application software or another type of control system, or a member of a collection of images in a database. Image data source 110 provides image data that, when used to display the image or convert the image into a hard copy, provides an approximate representation of the image. The image data source 110 provides the image data to the color adjustment system 100.

The image data input to the color adjustment subsystem 130 may be in either a device-dependent color space or a device-independent color space. For example, if the image data source 110 is a personal computer, the image data used for representing the image is typically in the RGB color space, since this is the color space used by a display of the image data source 110. These RGB values may be directly forwarded to the color adjustment subsystem 130 or may undergo conversion into a device-independent color space, such as L*a*b*, (the Commission Internationale de L'éclairage color standard) prior to being input to the color adjustment subsystem 130. L* defines lightness, a* corresponds to the red/green value, and b* denotes the amount of yellow/blue, which corresponds to the way the human eye perceives color. A neutral color is a color for which a*=b*=0.

If the conversion of the device-dependent color space values into device-independent color space values is not performed by the image data source 110 when inputting the image data to the color adjustment system 100, then the color adjustment system 100 may perform the conversion between the color spaces.

The color adjustment subsystem 130 transforms the device-independent image data into printable image data based on the color space used by the hard copy output device 150. For example, if the hard copy output device 150 is a printer, the color space used by the printer will often be the CMYK color space. In such a case, the color adjustment subsystem 130 converts the device-independent image data into CMYK-color space printable image data for the appropriate target value. Alternatively, the target values may be described in any of the color spaces L*a*b*, CMYK, RGB or sRGB or even the color number, such as a Pantone® number.

Because of various factors, such as environmental conditions, use patterns, the type of media used, variations in media, variations from original models used in initializing the hard copy output device, general wear, and the like, the colors capable of being output by the hard copy output device 150 may not match the desired colors represented by the device-independent image data.

In the color adjustment system, when a hard copy of the image is output by the hard copy output device 150, the hard copy is placed within the field of detection of the image sensor 180. Image sensor 180 generates image data from the hard copy image and transmits this image data in any of the device independent color coordinate spaces (reflectance spectra, L*a*b*, XYZ, LHC) or in device dependent spaces (CMY, CMYKL, RGB, sRGB) depending on the direct output or transformed output of the sensor image data to the color adjustment subsystem 130.

The color adjustment subsystem 130 compares the detected image data values with target image data stored in memory. Based on the comparison, adjustment factors are determined that adjust the printable image data to create a revised color combination for the target value such that the resulting image output by the hard copy output device 150 results in detected image data values that more closely correspond to the target image data. Alternatively, color adjustment subsystem may be utilized to develop new spot colors to meet customer demands and these new spot color combinations are stored in memory.

This process may be repeated a number of times until an amount of error between the detected image data and the target image data falls within an acceptable tolerance. The process may also be restricted to a preset number of iterations. Once the detected image data is within the given tolerances, and/or the maximum number of iterations has been performed, the color adjustment subsystem 130 provides the hard copy output device 150 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, substantially the same final image will be produced by each hard copy output device regardless of the different attributes and drifts of each printing device.

The particular methods performed by the spot color adjustment comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
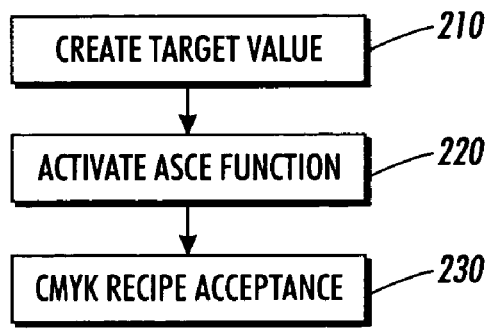
FIG. 2 is a flowchart outlining one exemplary embodiment of the method of operation of the automated spot color editor.

Turning now to FIG. 2, a flowchart illustrates an exemplary embodiment of the method of operation of the automated spot color editor. At 210 the spot color editor determines the appropriate target values for customer colors. The target values can be described in several forms for spot colors. For example, the target values can be in any of the following color spaces: reflectance spectra, L*a*b*, CMYK, RGB, sRGB, parameters describing color, or even the color number. If color numbers are used, the target values are determined via offline experiments. Such experiments would include 1) creating a test pattern with the spot color of interest, 2) printing the pattern on the printer of interest, 3) transporting the pattern for measurements (through the paper path for inline and carrying paper manually for offline measurements), 4) measuring the printed pattern with a color sensor and 5) storing the sensor output to a target log file. For inline measurements, the printer should have an input path for moving the printed pattern in the paper path.

The sensor output may be in any of the device independent color coordinate spaces (reflectance spectra, L*a*b*, XYZ, LHC) or in device dependent spaces (CMY, CMYK, RGB, sRGB) or parameters that succinctly distinguish color (for example, parameters {p1, p2, p3, . . . etc.} used to describe color) depending on the direct output or transformed output of the sensor. Also, the offline/inline experiments may be conducted to determine target values when color matching is required to a hard copy proof. Inline or offline sensors can also be used to obtain the color values of the targets for the hardcopy proofs. The ASCE provides an approach to capture a color value using a spot measurement of the hard copy sample. The approach includes (1) transporting the proof for measurements (through the paper path for inline and carrying proof manually for offline measurements), (2) initiating color sensor measurements to correctly measure the proof, (3) measuring the spot color area of interest in the proof with a color sensor and storing the sensor output to a target log file with a unique spot color identifier. For inline measurements from the proof, the printer should have an input path for moving the printed proof in the paper path while printing process mode is disabled (development, fusing, etc.). In another embodiment, the customer is able to adjust or enter the target values manually. Alternatively, the target colors can be obtained via menu links to the identified designations. The target table may also be a hypertext link to a remote networked site where the target values are adequately defined and labeled. These values may also be obtained using known formulae. The unique spot color identifier is used for the target values so that it matches with the color target names in the document that is to be RIP'ed with the new CMYK combination.

To activate the ASCE function at 220, a software button on the user interface is utilized. When the customer activates the ASCE, control system prints a target patch set using the desired target values developed at 210 or any other modified target values as required by the control algorithm depending on the spot colors. If the customer/operator is not satisfied with the printed spot colors in the test patch, this step would involve repeated iterations of the ASCE. The spot color control algorithms described in U.S. Patent Application Publication No. 2005/0030560 to Maltz et al. ("Methods and Systems for Controlling Out-of-gamut Memory and Index Colors") and U.S. Pat. No. 6,744,531 to Mestha et al. ("Color Adjustment Apparatus and Method"), both hereby incorporated by reference in their entirety, remove the manual color adjustment step and hence can identify the right CMYK combination without distorting other or neighborhood colors in the document. After the iterations are completed, ASCE finds the required CMYK combination for the chosen target values from 210. For determination of the number of iterations to be performed, the algorithm itself may identify the number of iterations required to find the required CMYK combination for the spot colors based on the criteria stored inside the algorithm. One such criteria would be the mean deltaE, where deltaE is the color difference metric, a value based on the Euclidian distance (the shortest line in 3D) between the coordinates of the reference and sample used to measure the color difference between target values (when target values are stored in terms of L*a*b*) and the measured values for all the spot colors of interest. DeltaE2000 is another perceptual based color difference metric just starting to be used in printing industry.

At 230, the operator can then decide to accept the CMYK combinations into the document where the spot color tag/name links the combinations to particular spot colors. The acceptability criteria may be based on visual inspection of a proof copy with printed color or simply the mean deltaE value. The customer then RIPs the image containing new CMYK values for printing.

Figure 3:
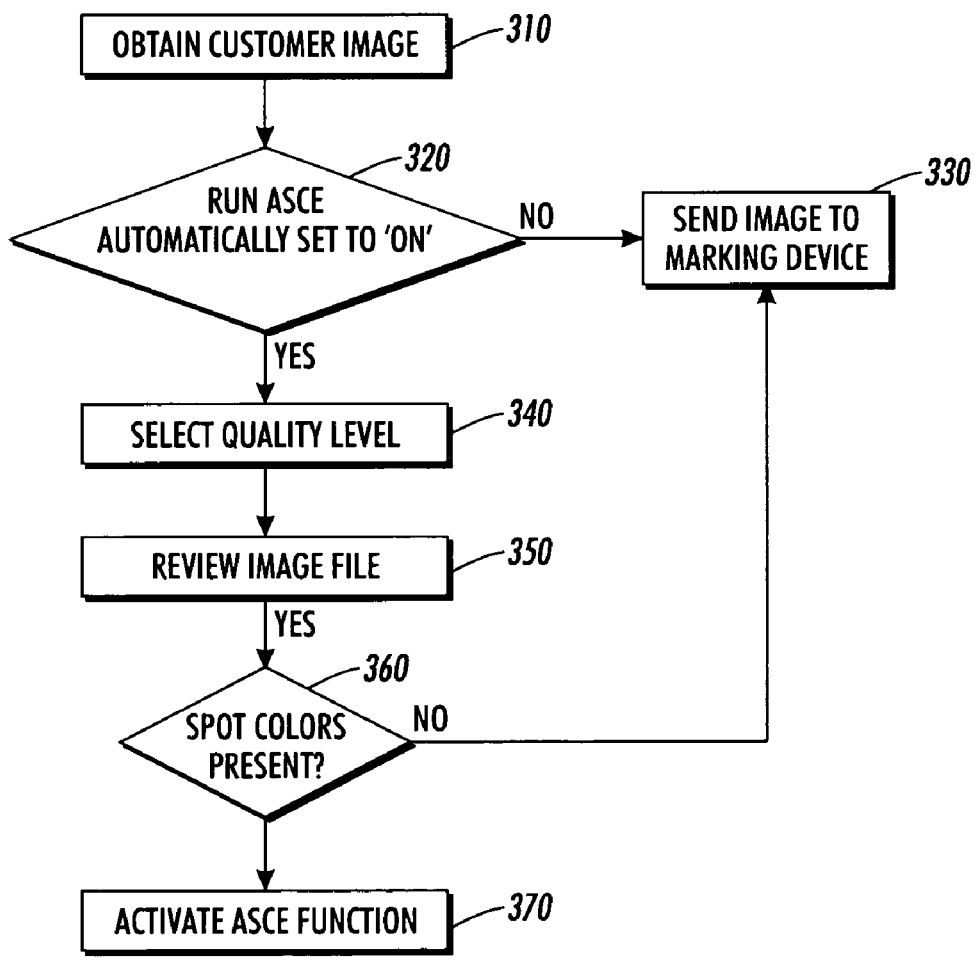
FIG. 3 is a flow chart outlining one exemplary embodiment of the automatic determination of the presence of spot colors in a print job prior to printing for use with the automated spot color editor.

Turning now to FIG. 3, the flow chart illustrates an example embodiment for the automatic determination of the presence of spot colors in a print job prior to printing for use with the automated spot color editor. While the spot color editor as described with respect to FIG. 2 automates workflow for modifying or adjusting CMYK values to achieve consistency and repeatability, it is still not fully automatic since the user has to define the spot color manually. To further automate the procedure, minimize the human error in correcting spot colors, and decrease the time needed to adjust spot colors, the images may be checked automatically after they are submitted but prior to being printed in a preflight step. The preflight step provides detection of the presence of spot colors in a submitted print job and activation of the automated spot color editor to correct for all spot colors found in the search procedure in each customer file. This automation would decrease the time needed to run ASCE and help to improve the accuracy and repeatability of spot colors in customer files.

At 310 a customer file is loaded on the printer and released for printing. At 320 a determination is made as to whether the queue level/job ticket feature "Run ASCE automatically" is set to "ON". If the "Run ASCE automatically" feature is not activated, the Image processing computer RIPs the file and sends the image to the marking device. If the "Run ASCE automatically" feature is activated, a quality level similar to deltaE criteria and iteration number as described hereinabove is selected at 340. The image file is reviewed at 350 to detect the presence of any spot colors. The spot color detection routine looks for any standardized document convention describing the use of spot colors, and their names (as one example, names standardized by Pantone Inc.), in the document. For example, if the customer image is in PostScript® format, the comment %%DocumentCustomColors indicates the use of custom (spot) colors in the document. Any application written in the Image Processing computer names these colors and their CMYK or RGB approximations through the %%CMYKCustomColor or %%RGBCustomColor comments in the body of the document. Table 1 below provides an example of a PostScript document with Pantone spot colors and comments describing the Pantone colors.

TABLE 1

%!PS-Adobe-3.0 EPSF-3.0
%%Creator: Adobe Illustrator(R) 8.0
%%AI8_CreatorVersion: 8
%%For: (John Stanzione) (Spot Color Source)
%%Title: (solid to process.eps)
%%CreationDate: (5/24/01) (1:02 PM)
%%BoundingBox: 0 0 0 0
%%HiResBoundingBox: 0 0 0 0
%%DocumentProcessColors:
%%DocumentSuppliedResources: procset Adobe_level2_AI5 1.2 0
%%+ procset Adobe_ColorImage_AI6 1.3 0
%%+ procset Adobe_Illustrator_AI5 1.3 0
%%+ procset Adobe_cshow 2.0 8
%%+ procset Adobe_shading_AI8 1.0 0
%AI5_FileFormat 4.0
%AI3_ColorUsage: Black&White
%AI3_IncludePlacedImages
%AI7_ImageSettings: 1
%%CMYKCustomColor: 0 0 0.51 0 (Color name)
%%+ 0 0 0.79 0 (Color name)
%%+ 0 0 0.95 0 (Color name)
%%+ 0 0.03 1 0.38 (Color name)
%%+ 0 0.03 1 0.6 (Color name)
%%+ 0 0.07 1 0.5 (Color name)
%%+ 0 0.02 0.81 0 (Color name)
%%+ 0 0.04 0.62 0 (Color name)
%%+ 0 0.02 0.95 0 (Color name)
.
.
.

As can be seen in Table 1, "%%CMYKCustomColor" provides an approximation of the custom color (spot color) CMYK values specified by the 'color name' in parentheses. Four components of cyan, magenta, yellow, and black are specified as numbers from 0 to 1 representing the percentage of that process color. The Document Structuring Convention allows continuation lines starting "%%+", so to find additional colors, the detection routine examines lines starting with "%%CMYKCustomColor" and lines immediately following such a line that begin with "%%+".

Alternatively, an approach such as that described in U.S. Pat. No. 6,456,395 to Ringness ("Method for Separating Colors of Encapsulated Postscript Images"), which describes some methods of spot color sniffing from an EPS file is also applicable. Ringness teaches a method for mapping objects (e.g., Pantone Red, Pantone Red 100, etc.) having object colors to the intended spot-color plate for offset printing. For example, to map Pantone Red in one EPS file to Pantone Red 100 in another EPS file, which together was meant to produce the same Pantone Red on the same spot-color plate. Instead of performing the color separations manually, a software utility is created for separating object colors in an EPS file and then mapping the objects to the appropriate spot-color partitions. A utility called Encapsulated POSTSCRIPT Color Separation (ECS) is proposed to perform this function.

A determination is made at 360 as to whether the image file contains spot colors. If no spot colors have been identified in the image file, the image processing computer RIPs the file and sends the image to the marking device. If spot colors are present, the spot color editor is activated automatically at 370. The spot color editor may run while another job is printing, or the print job may be "held" until the current print job in process completes. The advantages of running spot color editor automatically include reduction of the effects of long term engine drift and spot color stability observed in customer prints, time savings (the customer no longer needs to manually start the spot color editor from the image processing computer and include a newly calculated CMYK combination after clearing acceptance criteria manually), reduced operator error, and no required operator intervention.

Figure 4:
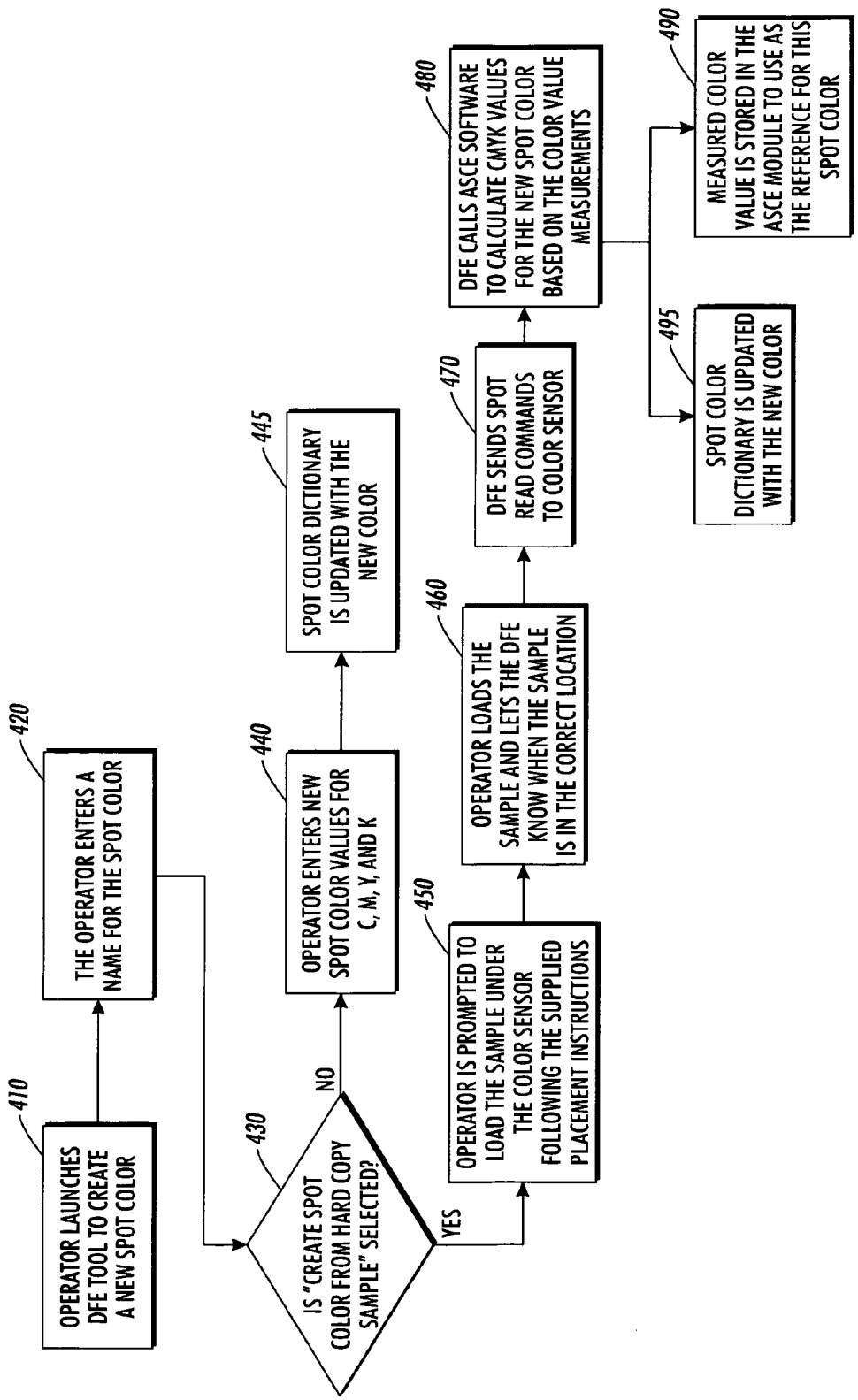
FIG. 4 is a flow chart outlining one exemplary embodiment of a method for creation of a new spot color for use with the automated spot color editor.

Turning now to FIG. 4, the flow chart illustrates an example embodiment of a method for creation of a new spot color for use with the automated spot color editor. When an operator manually starts the spot color editor from the image processing computer graphical user interface, a default list of colors is available that is the same as the last time the spot color editor was run manually. The operator selects a quality level, which includes the color specifications (for example dE2000) and maximum number of iterations for the spot color editor. The operator then launches the image processing computer tool to create a new spot color at 410. The operator enters a name for the spot color at 420 and queries whether "create spot color from hard copy sample" has been selected from the graphical user interface at 430. If the spot color will not be created from a hard copy sample, the operator enters the new spot color values for CMYK at 440. For example, a specific Pantone color would be characterized with the unique values for CMYK that define the specific color. The spot color dictionary is updated at 445 with the new color information.

If the spot color is to be created from a hard copy sample, the operator is prompted to load the sample under the color sensing device such as a XRITE DTP41 Spectrophotometer sensor or inline spectrophotometer sensor following the supplied placement instructions at 450. The inline spectrophotometer sensor may be located in the print engine output paper path with a cable connected to a processor board. The processor board would then be connected to the image processing computer, either directly or through other processing boards. The operator loads the sample at 460 and informs the image processing computer when the sample is in the correct location at 460. The image processing computer transmits spot read commands to the color sensing device at 470. The image processing computer calls the spot color editor at 480 to calculate the CMYK values for the new spot color based on the color (e.g., L*a*b*) measurements made by the color sensing device. The measured color (e.g., L*a*b*) values are stored in the spot color editor module to use as the reference for this spot color at 490. The spot color dictionary is then updated with the new spot color at 495.

While the present discussion has been illustrated and described with reference to specific embodiments, further modification and improvements will occur to those skilled in the art. For example, the system and method described in U.S. application Ser. No. 11/507,406 filed Aug. 21, 2006, titled "Spot Color Controls and Method", may be utilized to perform the ASCE function. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for enabling accurate and consistent imaging of selected colors within a document for various printing device configurations utilizing an automated spot color editor, the method comprising:
   determining appropriate target values for a selected color within a print job, wherein said selected color may be described as within at least one color space, wherein said color space includes at least one member selected from the group consisting of reflectance spectra, L*a*b*, XYZ, LHC, CMYK, RGB, sRGB, parameters describing color and a color number;
   operating an automated spot color editor to modify or adjust said selected color, comprising:
      selecting a quality level and a maximum number of iterations, wherein said quality level comprises a color difference metric, and wherein said maximum number of iterations is the maximum number of times the automated spot color editor is operated to calculate a CMYK color formula;
      printing at least one sample patch for said selected target value;
      analyzing the color composition of said sample patch, calculating a CMYK color formula based on said color composition of said sample patch; and
      inserting said CMYK color formula into a spot color editing table; and
      providing capability for acceptance of said color formula by an operator through a graphical user interface.

2. The method according to claim 1, wherein determining appropriate target values for said selected color when said selected color is described with said color number comprises performing offline experiments, comprising:
   creating a test pattern with said selected color described with said color number;
   printing said test pattern on a printing device;
   transporting said printed test pattern for measurement by a color sensing device;

measuring said printed test pattern with said color sensing device; and providing measured test pattern data to a target value dictionary within said automated spot color editor.

3. The method according to claim 1, wherein analyzing the color composition of said sample patch comprises:

transporting said sample patch for measurement by a color sensing device;

initiating color sensing measurements with said color sensing device to correctly determine the color characteristics of said sample patch, wherein the output data of said color sensing device may be in at least one member selected from the group consisting of reflectance spectra, L*a*b*, XYZ, LHC, CMYK, RGB, sRGB, and parameters describing color; and storing said color characteristics of said sample patch to a target value dictionary within said automated spot color editor, wherein each said target value stored within said target value dictionary has a unique spot color identifier.

4. The method according to claim 3, wherein said color sensing device includes at least one member selected from the group consisting of an optical sensor, spectrophotometer, and a color sensor.

5. The method according to claim 1, wherein determining appropriate target values includes at least one member selected from the group consisting of manual entry of said target values;

obtaining said target values through menu links to a networked site, and by utilizing known formulae.

6. The method according to claim 1, further comprising detecting of the presence of selected colors after submittal of said print job, comprising:

receiving an image file for said print job;

determining whether the 'operate the automated spot color editor automatically' feature is activated;

sending said image to a marking device if said 'operate automated spot color editor automatically feature' is not activated;

selecting a quality level and iteration number if said 'operate automated spot color editor automatically feature' is activated;

reviewing said image file to detect the presence of selected colors by searching for standardized document conventions describing the use of selected colors or the names of selected colors;

determining whether selected colors are present;

sending said image to a marking device if no selected colors have been identified in said image file; and activating the automated spot color editor if the presence of selected colors has been detected in said image file.

7. The method according to claim 1, further comprising creation of a new selected color for use with the automated spot color editor, comprising:

activating the automated spot color editor;

selecting a quality level and a maximum number of iterations;

entering a name for said new selected color;

determining whether the feature 'create spot color from hard copy sample' has been activated from the graphical user interface;

entering new spot color values for C, M, Y, and K and updating a spot color dictionary with said new spot color values if said feature has not been selected;

prompting a user to load said hard copy sample under a color sensing device if said feature has been selected;

indicating when said hard copy sample is in the correct location under said color sensing device;

transmitting read commands to said color sensing device;

storing said measurements in the automated spot color editor for use as a reference for said new spot color;

activating the automated spot color editor to calculate CMYK values for said new spot color based on measurements made by said color sensing device; and updating a spot color dictionary to include said CMYK values for said new spot color.

8. A system for enabling accurate and consistent imaging of selected colors within a document for various printing device configurations utilizing an automated spot color editor, the system comprising:

means for determining appropriate target values for a selected color within a print job, wherein said selected color may be described as within at least one color space, wherein said color space includes at least one member selected from the group consisting of reflectance spectra, L*a*b*, XYZ, LHC, CMYK, RGB, sRGB, parameters describing color and a color number;

means for operating an automated spot color editor to modify or adjust said selected color, comprising:

means for selecting a quality level and a maximum number of iterations, wherein said quality level comprises a color difference metric, and wherein said maximum number of iterations is the maximum number of times the automated spot color editor is operated to calculate a CMYK color formula;

means for printing at least one sample patch for said selected target value;

means for analyzing the color composition of said sample patch;

means for calculating a CMYK color formula based on said color composition of said sample patch; and means for inserting said CMYK color formula into a spot color editing table; and means for providing capability for acceptance of said color formula by an operator.

9. The system according to claim 8, wherein means for determining appropriate target values for said selected color when said selected color is described with said color number comprises performing offline experiments, comprises:

means for creating a test pattern with said selected color described with said color number;

means for printing said test pattern on a printing device;

means for transporting said printed test pattern for measurement by a color sensing device;

means for measuring said printed test pattern with said color sensing device; and means for providing measured test pattern data to a target value dictionary within said automated spot color editor.

10. The system according to claim 8, wherein means for analyzing the color composition of said sample patch comprises:

means for transporting said sample patch for measurement by a color sensing device;

means for initiating color sensing measurements with said color sensing device to correctly determine the color characteristics of said sample patch, wherein the output data of said color sensing device may be in at least one member selected from the group consisting of reflectance spectra, L*a*b*, XYZ, LHC, CMYK, RGB, sRGB, and parameters describing color; and means for storing said color characteristics of said sample patch to a target value dictionary within said automated spot color editor, wherein each said target value stored within said target value dictionary has a unique spot color identifier.

11. The system according to claim 10, wherein said color sensing device includes at least one member selected from the group consisting of an optical sensor, spectrophotometer, and a color sensor.

12. The system according to claim 8, wherein means for determining appropriate target values includes at least one member selected from the group consisting of manual entry of said target values, obtaining said target values through menu links to a networked site, and by utilizing known formulae.

13. The system according to claim 8, further comprising means for detecting of the presence of selected colors after submittal of said print job, comprising:
   means for receiving an image file for said print job;
   means for determining whether the 'operate the automated spot color editor automatically' feature is activated;
   means for sending said image to a marking device if said 'operate automated spot color editor automatically feature' is not activated;
   means for selecting a quality level and iteration number if said 'operate automated spot color editor automatically feature' is activated;
   means for reviewing said image file to detect the presence of selected colors by searching for standardized document conventions describing the use of selected colors or the names of selected colors;
   means for determining whether selected colors are present;
   means for sending said image to a marking device if no selected colors have been identified in said image file; and
   means for activating the automated spot color editor if the presence of selected colors has been detected in said image file.

14. The system according to claim 8, further comprising creation of a new selected color for use with the automated spot color editor, comprising:
   means for activating the automated spot color editor;
   means for selecting a quality level and a maximum number of iterations;
   means for entering a name for said new selected color;
   means for determining whether the feature 'create spot color from hard copy sample' has been activated from the graphical user interface;
   means for entering new spot color values for C, M, Y, and K and updating a spot color dictionary with said new spot color values if said feature has not been selected;
   means for prompting a user to load said hard copy sample under a color sensing device if said feature has been selected;
   means for indicating when said hard copy sample is in the correct location under said color sensing device;
   means for transmitting read commands to said color sensing device;
   means for storing said measurements in the automated spot color editor for use as a reference for said new spot color;
   means for activating the automated spot color editor to calculate CMYK values for said new spot color based on measurements made by said color sensing device; and
   means for updating a spot color dictionary to include said CMYK values for said new spot color.

15. A non-transitory computer-readable storage medium having computer readable program code embodied in said medium which, when said program code is executed by a computer causes said computer to perform method steps for enabling adaptive print job content processing as a function of the electronic file content, the method comprising:
   determining appropriate target values for a selected color within a print job, wherein said selected color may be described as within at least one color space, wherein said color space includes at least one member selected from the group consisting of reflectance spectra, L*a*b*, XYZ, LHC, CMYK, RGB, sRGB, parameters describing color and a color number;
   operating an automated spot color editor to modify or adjust said selected color, comprising:
      selecting a quality level and a maximum number of iterations, wherein said quality level comprises a color difference metric, and wherein said maximum number of iterations is the maximum number of times the automated spot color editor is operated to calculate a CMYK color formula;
      printing at least one sample patch for said selected target value;
      analyzing the color composition of said sample patch;
      calculating a CMYK color formula based on said color composition of said sample patch; and
      inserting said CMYK color formula into a spot color editing table; and
      providing capability for acceptance of said color formula in a graphical user interface.

16. The non-transitory computer-readable storage medium according to claim 15, wherein determining appropriate target values for said selected color when said selected color is described with said color number comprises performing offline experiments, comprising:
   creating a test pattern with said selected color described with said color number;
   printing said test pattern on a printing device;
   transporting said printed test pattern for measurement by a color sensing device;
   measuring said printed test pattern with said color sensing device; and
   providing measured test pattern data to a target value dictionary within said automated spot color editor.

17. The non-transitory computer-readable storage medium according to claim 15, wherein analyzing the color composition of said sample patch comprises:
   transporting said sample patch for measurement by a color sensing device;
   initiating color sensing measurements with said color sensing device to correctly determine the color characteristics of said sample patch, wherein the output data of said color sensing device may be in at least one member selected from the group consisting of reflectance spectra, L*a*b*, XYZ, LHC, CMYK, RGB, sRGB, and parameters describing color; and
   storing said color characteristics of said sample patch to a target value dictionary within said automated spot color editor, wherein each said target value stored within said target value dictionary has a unique spot color identifier.

18. The non-transitory computer-readable storage medium according to claim 17, wherein said color sensing device includes at least one member selected from the group consisting of an optical sensor, spectrophotometer, and a color sensor.

19. The non-transitory computer-readable storage medium according to claim 15, wherein determining appropriate target values includes at least one member selected from the group consisting of manual entry of said target values; obtaining said target values through menu links to a networked site, and by utilizing known formulae.

20. The non-transitory computer-readable storage medium according to claim 15, further comprising detecting of the presence of selected colors after submittal of said print job, comprising:
- receiving an image file for said print job;
- determining whether the 'operate the automated spot color editor automatically' feature is activated;
- sending said image to a marking device if said 'operate automated spot color editor automatically feature' is not activated; selecting a quality level and iteration number if said 'operate automated spot color editor automatically feature' is activated;
- reviewing said image file to detect the presence of selected colors by searching for standardized document conventions describing the use of selected colors or the names of selected colors;
- determining whether selected colors are present;
- sending said image to a marking device if no selected colors have been identified in said image file; and
- activating the automated spot color editor if the presence of selected colors has been detected in said image file.

* * * * *